United States Patent [19]

Aoki

[11] Patent Number: 4,466,247
[45] Date of Patent: Aug. 21, 1984

[54] SYSTEM FOR CORRECTING THE EFFECT OF ALTITUDE ON A TURBOCHARGED INTERNAL COMBUSTION ENGINE

[75] Inventor: Kenzo Aoki, Tokyo, Japan

[73] Assignee: Fuji Jukogyo Kabushiki Kaisha, Tokyo, Japan

[21] Appl. No.: 386,145

[22] Filed: Jun. 7, 1982

[30] Foreign Application Priority Data

Jun. 15, 1981 [JP] Japan ................... 56-92892

[51] Int. Cl.³ ............................................. F02B 37/12
[52] U.S. Cl. ..................................................... 60/602
[58] Field of Search ................. 60/600, 601, 602, 603, 60/611; 123/564

[56] References Cited

U.S. PATENT DOCUMENTS 1,508,707  9/1924  Moss .................................. 60/600 X
4,174,617  11/1979  Karchay .............................. 60/602

FOREIGN PATENT DOCUMENTS 822872  1/1938  France ................................. 123/564
14695  3/1919  United Kingdom ................ 123/564
291152  5/1928  United Kingdom ................ 123/564

Primary Examiner—Michael Koczo
Attorney, Agent, or Firm—Martin A. Farber

[57] ABSTRACT

A system for correcting the effect of altitude on an engine with a supercharger. A bypass is provided to bypass an exhaust gas turbine of the supercharger and a waste gate valve is provided in the bypass. An actuator is provided for operating the waste gate valve. The actuator has a supercharging pressure chamber supplied with supercharging air, a standard pressure chamber filled with air at standard pressure, and a diaphragm partitioning both chambers. The diaphragm is operatively connected to the waste gate valve so as to open it when the diaphragm is deflected by an increase of the pressure in the supercharging pressure chamber.

6 Claims, 3 Drawing Figures

SYSTEM FOR CORRECTING THE EFFECT OF ALTITUDE ON A TURBOCHARGED INTERNAL COMBUSTION ENGINE

BACKGROUND OF THE INVENTION

The present invention relates to a system for correcting the effect of altitude on an internal combustion engine with a supercharging device for a vehicle.

An internal combustion engine for an automobile is provided with a supercharger driven by an exhaust-gas turbine having a small capacity, so that the supercharger may start to operate at a low engine speed. As a result of such a supercharger, supercharging pressure increases excessively with an increase in the engine speed as shown by the dotted line in FIG. 1, which may cause a breakdown of the engine. In order to avoid such damage, for example, a system has been proposed by Japanese Utility Model Application Publication No. 47-38660. The system comprises a bypass provided in the exhaust gas turbine for the supercharger, a waste gate valve in the bypass, and an actuator for operating the waste gate valve. The actuator comprises a diaphragm operatively connected to the waste gate valve, an atmospheric chamber and a supercharging pressure chamber partitioned by the diaphragm. The diaphragm is deflected by the difference between the atmospheric pressure and the supercharging pressure when the supercharging pressure increases. Thus, the actuator operates to open the waste gate valve when the engine speed is higher than a predetermined speed. Accordingly, an increase of the supercharging pressure is prevented as shown by "a" in FIG. 1.

However, since the atmospheric pressure is low at high altitude, the actuator operates at a low supercharging pressure as shown by "b" in FIG. 1. Therefore, the low supercharging pressure does not effectively provide an increase in the engine output.

SUMMARY OF THE INVENTION

The object of the present invention is to provide a system which corrects the standard pressure in the atmospheric chamber of the actuator, while the atmospheric pressure varies, whereby the engine output is increased even at high altitudes by supercharging.

According to the present invention, there is provided a system for correcting the effect of altitude on an internal combustion engine having an intake passage, an exhaust passage, a supercharger comprising a turbine driven by the exhaust gases and a compressor driven by the turbine for supercharging, a bypass for bypassing the compressor, and a waste gate valve provided in the bypass. An actuator comprises a housing, a diaphragm for partitioning a chamber in the housing, defining on one side a supercharging pressure chamber communicating with the intake passage at the downstream side of the compressor and thus with supercharging pressure and a standard pressure chamber on the other side of the diaphragm. The standard pressure chamber is filled with air at standard pressure. The diaphragm is operatively connected with the waste gate valve for the opening the latter, whereby when the supercharging pressure exceeds the standard pressure in the standard pressure chamber, the diaphragm is deflected to open the waste gate valve.

DETAILED DESCRIPTION OF THE PREFERRED EMBODIMENTS

Figure 2:
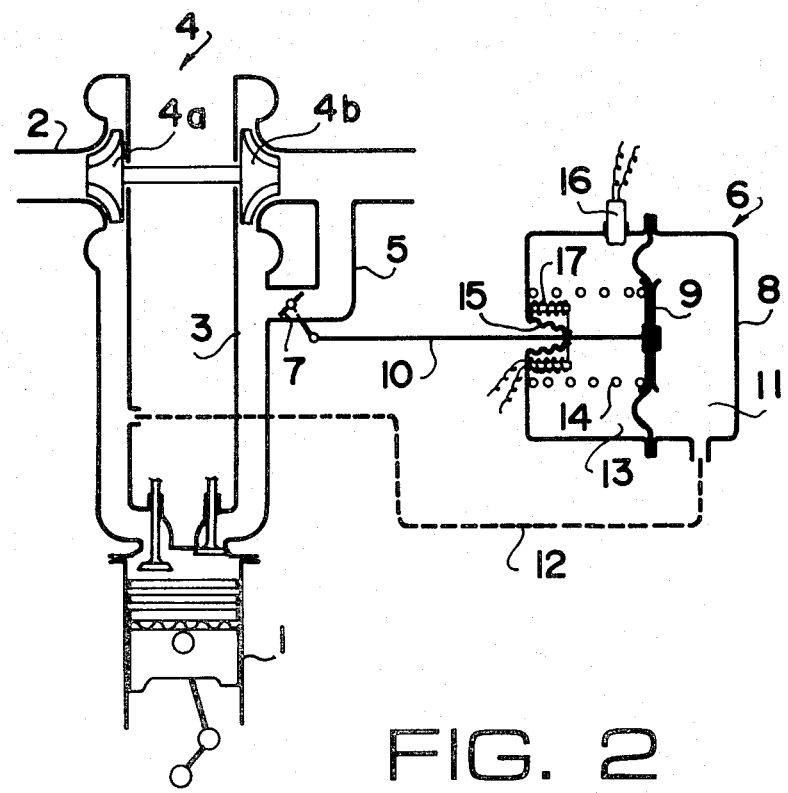
FIG. 2 is a schematic view of a system according to the present invention.

Referring to FIG. 2, an engine 1 is provided with an induction or intake passage 2 and an exhaust passage 3. A supercharging device 4 is installed in the engine 1. The supercharging device 4 comprises a supercharger or compressor 4a in the intake passage 2 and an exhaust-gas turbine 4b provided in the exhaust passage 3 driven by exhaust gases. The supercharger 4a is operatively connected to the turbine 4b to supercharge. A bypass 5 connected to the exhaust passage bypasses the turbine 4b. A waste gate valve 7 is provided in the bypass 5. The waste gate valve 7 is adapted to be operated by an actuator 6. The actuator 6 comprises a housing 8, and a diaphragm 9 partitioning a supercharging pressure chamber 11 and a standard pressure chamber 13. The diaphragm 9 is operatively connected to the shaft of the valve 7 by a rod 10 so as to rotate a vane of the valve. The supercharging pressure chamber 11 communicates via a conduit pipe 12 with the intake passage 2 at the downstream side of the compressor 4a so as to be supplied with the supercharging air. In the standard pressure chamber 13, a return spring 14 biases the diaphragm 9 and a bellows 15 is secured between the housing 8 and the rod 10 for airtight sealing of the standard pressure chamber 13. An absolute pressure transducer 16 and a heater 17 are provided in the standard pressure chamber 13. The absolute pressure transducer 16 is adapted to produce an output voltage which is proportional to the pressure of the air in the chamber 13. The chamber 13 is filled with air at the standard atmospheric pressure.

Figure 3:
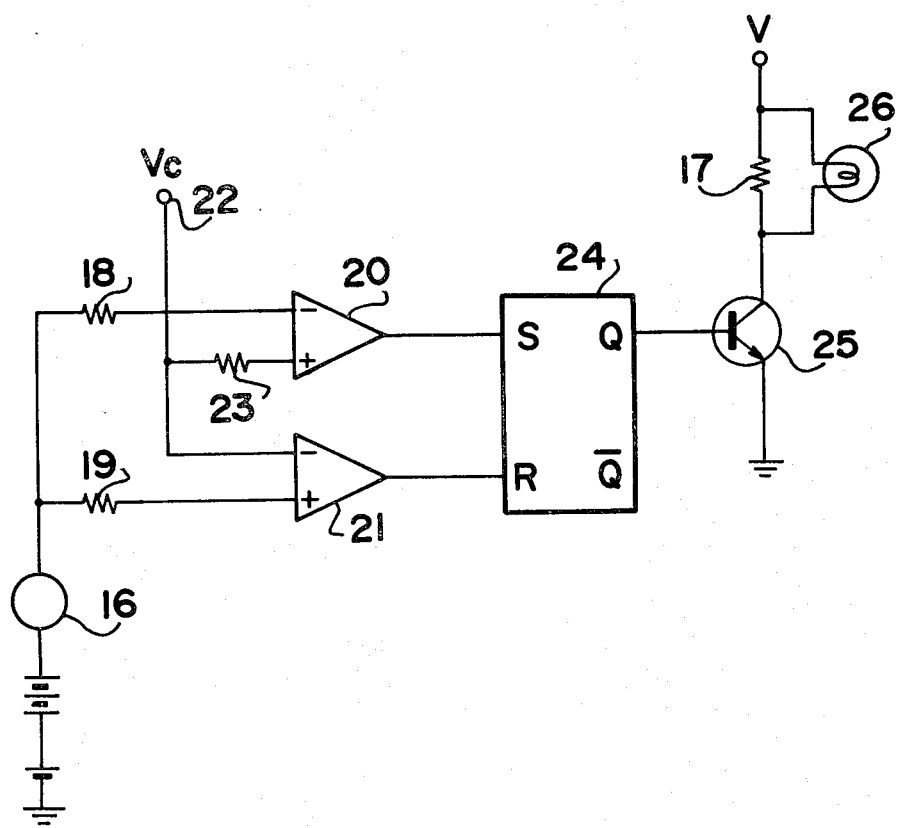
FIG. 3 is a circuit for controlling the standard pressure of the actuator.

Referring to FIG. 3, the output of the absolute pressure transducer 16 is connected to an inverting input of a comparator 20 through a resistor 18 and is connected to a non-inverting input of a comparator 21 through a resistor 19. The non-inverting input of the comparator 20 is applied with a reference voltage from a standard voltage terminal 22 through a resistor 23 and the inverting input of the comparator 21 is applied with the standard voltage from the terminal 22 without a resistor. The outputs of both comparators 20 and 21 are connected to S and R terminals of a flip-flop 24, respectively. The Q output of the flip-flop 24 is connected to the base of a transistor 25 for turning the transistor on or off. The transistor 25 is connected in series to the heater 17 and a warning lamp 26 is connected to the heater 17 in parallel.

In operation, when the supercharging pressure applied from the intake passage 2 to the chamber 11 is low, the diaphragm 9 is deflected by the spring 14 to close the waste gate valve 7. Thus, all the exhaust gases discharged from the engine are supplied to the turbine 4b to drive it, thereby driving the compressor 4a. Accordingly, a large amount of air is supplied to the engine at a high supercharging pressure. When the supercharging pressure reaches a predetermined high value, the diaphragm 9 is deflected by the pressure against the force of the spring 14 so as to open the valve 7. Thus, a portion of the exhaust gases passes through the bypass 5, so that the output of the turbine 4b decreases, thereby decreasing the supercharging pressure.

Figure 1:
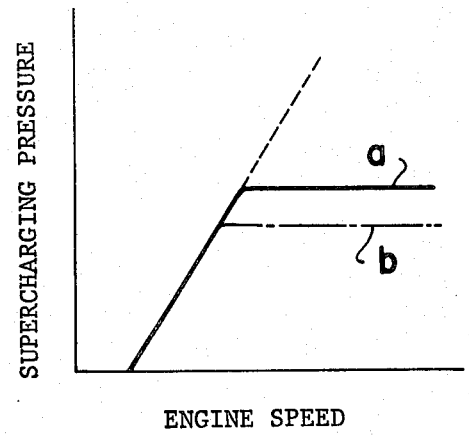
FIG. 1 is a graph showing a relationship between the engine speed and the supercharging pressure.

Since the standard pressure chamber 13 has been filled with air at the standard atmospheric pressure, if the environmental air pressure decreases when the vehicle is at a high altitude, the supercharging pressure is controlled with reference to the same standard as at low altitude. Accordingly, the supercharging pressure is controlled with the characteristic of "a" in FIG. 1 at high altitude.

When the pressure in the chamber 13 is at the standard atmospheric pressure, the output of the pressure transducer 16 is at a high level and hence the output of the comparator 20 is at a low level and the output of the comparator 21 is at a high level. Accordingly, the flip-flop 24 is reset, so that the Q output thereof is at a low level whereby the transistor 25 is turned off. If the pressure in the chamber 13 decreases due to leakage of the air caused by low atmospheric pressure or to low environmental temperature, the output of the pressure transducer 16 decreases, causing the comparator 20 to produce a high level output. Thus, the flip-flop is set to change the Q output to a high level. Accordingly, the transistor 25 is turned on and current passes through the heater 17 which heats up, heating the air in the chamber 13. Thus, the pressure in the chamber is increased to maintain the standard pressure in the chamber 13.

Although the illustrated embodiment is a supercharging device with a supercharger driven by an exhaust-gas turbine, the present invention may be applied to a supercharging device driven directly by the crankshaft of the engine. In such a device, a bypass having a gate valve is provided so as to bypass the supercharger.

From the foregoing it will be understood that the present invention provides a system which comprises a waste gate valve actuator having a standard pressure chamber whereby supercharging may be effected at high altitudes for increasing the output of the engine.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a system for correcting the effect of altitude on an internal combustion engine having an intake passage and an exhaust passage, a supercharging device comprising a supercharger in the intake passage, a bypass bypassing a part of said supercharging device, and a gate valve provided in said bypass, wherein the improvement comprising:

an actuator means having a housing, said actuator means for actuating the gate valve;

said actuator means including a diaphragm partitioning said housing into a supercharging pressure chamber and a sealed standard pressure chamber;

said supercharging pressure chamber communicating with said intake passage at a downstream side of said supercharger so as to be supplied with supercharging pressure;

said sealed standard pressure chamber contains air at a standard pressure;

means for operatively connecting said diaphragm with said gate valve for opening the latter by deflecting said diaphragm when the supercharging pressure exceeds said standard pressure in said sealed standard pressure chamber, and means for increasing the pressure in said standard pressure chamber to the standard pressure when the pressure in said standard pressure chamber becomes less than the standard pressure.

2. In a system for correcting the effect of altitude on an internal combustion engine having an intake passage and an exhaust passage, a supercharging device comprising a supercharger in the intake passage, a bypass bypassing a part of said supercharging device, and a gate valve provided in said bypass, wherein the improvement comprising:

an actuator means having a housing, said actuator means for actuating the gate valve;

said actuator means including a diaphragm partitioning said housing into a supercharging pressure chamber and a sealed standard pressure chamber;

said supercharging pressure chamber communicating with said intake passage at a downstream side of said supercharger so as to be supplied with supercharging pressure;

said sealed standard pressure chamber contains air at a standard pressure;

means for operatively connecting said diaphragm with said gate valve for opening the latter by deflecting said diaphragm when the supercharging pressure exceeds said standard pressure in said sealed standard pressure chamber, a pressure transducer means for detecting the pressure in said standard pressure chamber, a heater provided in said standard pressure chamber, and an electric circuit means responsive to the output of said pressure transducer means for passing electric current through said heater when the pressure in said standard pressure chamber becomes less than the standard pressure.

3. The system according to claim 2, wherein the standard pressure is standard atmospheric pressure.

4. In a system for correcting the effect of altitude on an internal combustion engine of a motor vehicle having an intake passage and an exhaust passage, a supercharging device including a turbine provided in the exhaust passage for actuating a compressor provided in the intake passage in dependency on the exhaust gases exhausted from the engine, a bypass by-passing said turbine, a gate valve means in the bypass and actuating means for actuating the gate valve means in response to supercharging pressure for correcting the altitude effect of the engine, the improvement of the system wherein, said actuating means including a diaphgram operatively connected to said gate valve means for actuating said gate valve means, a supercharging pressure chamber defined on one side of said diaphragm and communicating with said intake passage downstream of said compressor, and a sealed standard pressure chamber defined on the other side of said diaphragm containing air at standard pressure, said actuating means being for opening said gate valve means by deflection of said diaphragm when the supercharging pressure exceeds said standard pressure, and correcting means on said actuating means, said correcting means comprising means for sensing the pressure in said standard pressure chamber, and means for increasing the pressure in said standard pressure chamber to the standard pressure when the pressure in said standard pressure chamber becomes less than the standard pressure.

5. The correcting system according to claim 4, wherein said correcting means comprises a presure transducer means, constituting said sensing means, for detecting the pressure in said standard pressure chamber, heating means, constituting said increasing means, for heating the air in the standard pressure chamber, and electric circuit means for actuating said heating means in response to an output signal of said transducer means for passing electric current through said heating means when the pressure in the standard pressure chamber becomes less than the standard pressure.

6. The correcting system according to claim 5, wherein said transducer means is an absolute pressure transducer, said electric circuit means comprises a switching means connected to said heating means, comparator means for comparing a reference voltage from a reference voltage terminal with the output signal of said absolute pressure transducer, and a flip-flop means for actuating said switching means in response to the output signal of said comparator means so as to activate said heating means whereby the pressure in the standard pressure chamber is maintained at the standard pressure.

* * * * *